(12) United States Patent
Badoni et al.

(10) Patent No.: US 11,063,784 B2
(45) Date of Patent: *Jul. 13, 2021

(54) CENTRALIZED MANAGEMENT OF AUTHORITATIVE EDGE DEVICES

(71) Applicant: Cisco Technology, Inc., San Jose, CA (US)

(72) Inventors: Gaurav Badoni, San Jose, CA (US); Dhananjaya Rao, Milpitas, CA (US); Hasmit Grover, Fremont, CA (US); Senthil Kenchiah, Dublin, CA (US); Vrushali Ashtaputre, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,703

(22) Filed: Apr. 23, 2019

(65) Prior Publication Data

US 2019/0253276 A1 Aug. 15, 2019

Related U.S. Application Data

(63) Continuation of application No. 13/939,667, filed on Jul. 11, 2013, now Pat. No. 10,313,155.

(51) Int. Cl.
*H04L 12/24* (2006.01)
*H04L 12/46* (2006.01)
(Continued)

(52) U.S. Cl.
CPC ...... *H04L 12/4641* (2013.01); *H04L 41/0813* (2013.01); *H04L 41/0856* (2013.01);
(Continued)

(58) Field of Classification Search
CPC ...................................................... H04L 12/24
(Continued)

(56) References Cited

U.S. PATENT DOCUMENTS 6,678,241 B1 1/2004 Gai et al.
6,741,592 B1 5/2004 Edsall et al.
(Continued)

*Primary Examiner* — Sibte H Bukhari
(74) *Attorney, Agent, or Firm* — Behmke Innovation Group LLC; James M. Behmke; Jonathon P. Western

(57) ABSTRACT

In one embodiment, an authoritative edge device (AED)-server in a computer network maintains assignment of an active AED for a particular virtual local area network (VLAN), and in response to a triggered re-assignment, sends an AED change request identifying an old active AED for the particular VLAN and a new active AED for the particular VLAN (e.g., and/or corresponding backups). In response to receiving the change request, the old active AED ceases forwarding of traffic for the particular VLAN and transmits a relinquishment confirmation into the network. Also, in response to receiving the change request and the relinquishment confirmation from the old active AED, the new active AED assumes responsibility for traffic forwarding for the particular VLAN and transmits an activation confirmation into the network. The change request is then deemed completed by the AED-sever upon receipt of both the relinquishment confirmation and the activation confirmation.

11 Claims, 14 Drawing Sheets

(51) Int. Cl.
*H04L 12/715* (2013.01)
*H04L 12/703* (2013.01)
*H04L 12/717* (2013.01)

(52) U.S. Cl.
CPC .............. *H04L 45/04* (2013.01); *H04L 45/28* (2013.01); *H04L 45/42* (2013.01)

(58) Field of Classification Search
USPC ......................................................... 709/221
See application file for complete search history.

(56) References Cited

U.S. PATENT DOCUMENTS

| | | |
|---|---|---|
| 6,976,088 B1 | 12/2005 | Gai et al. |
| 7,581,024 B1 * | 8/2009 | Yip ..................... H04L 12/4679 370/228 |
| 2006/0182121 A1 | 8/2006 | Kounin et al. |
| 2007/0237148 A1 | 10/2007 | Jabr et al. |
| 2009/0037607 A1 * | 2/2009 | Farinacci ............ H04L 12/4641 709/249 |
| 2013/0173756 A1 * | 7/2013 | Luna ................... H04L 43/0876 709/219 |
| 2013/0198558 A1 | 8/2013 | Rao |

\* cited by examiner

CENTRALIZED MANAGEMENT OF AUTHORITATIVE EDGE DEVICES

CROSS REFERENCE TO RELATED APPLICATIONS

This application is a continuation of U.S. patent application Ser. No. 13/939,667, titled "CENTRALIZED MANAGEMENT OF AUTHORITATIVE EDGE DEVICES," filed, Jul. 11, 2013, the disclosure of which is incorporated herein by reference.

TECHNICAL FIELD

The present disclosure relates generally to computer networks, and, more particularly, to management of authoritative edge devices.

BACKGROUND

An Edge Device (ED) is a device that sits on the boundary of layer-2 (L2) and layer-3 (L3) networks, and performs encapsulation and decapsulation of data from L2 to L3 and vice-versa. Generally, from a set of "capable devices", that is, EDs that are capable of forwarding traffic for a given set of virtual local area networks (VLANs), an Authoritative Edge Device (AED) is an ED that is currently forwarding traffic for a given set of VLANs.

Unlike in L3 networks, where a momentary loop in a routing path is acceptable due to the concept of time-to-live (TTL), L2 networks cannot tolerate momentary loops. For example, such loops can destabilize the network leading to prolonged broadcast storms and network meltdown. Despite Spanning Tree Protocol (STP) L2 loop resolution, L2 virtual private network (L2VPN) over L3 technology demands multiple edge devices to have the ability to encapsulate and decapsulate data belonging to the same VLAN. This can cause L2 loops if there is even a momentary overlap of forwarding roles between two or more edge devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
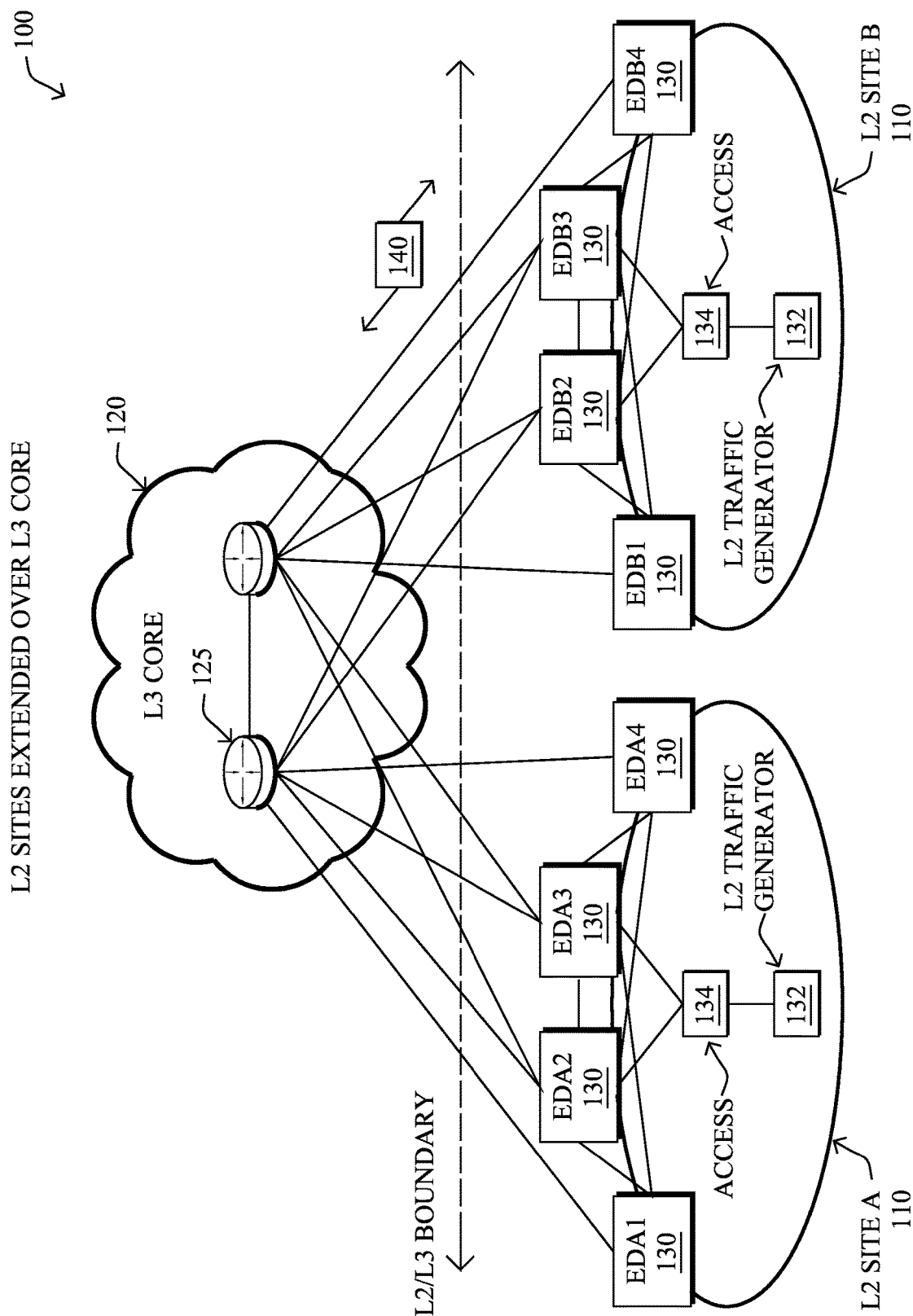
FIG. 1 illustrates an example computer network.

According to one or more embodiments of the disclosure, an authoritative edge device (AED)-server in a computer network maintains assignment of an active AED for a particular virtual local area network (VLAN), and in response to a triggered re-assignment, sends an AED change request identifying an old active AED for the particular VLAN and a new active AED for the particular VLAN (e.g., and/or corresponding backups). In response to receiving the change request, the old active AED ceases forwarding of traffic for the particular VLAN and transmits a relinquishment confirmation into the network. Also, in response to receiving the change request and the relinquishment confirmation from the old active AED, the new active AED assumes responsibility for traffic forwarding for the particular VLAN and transmits an activation confirmation into the network. (In one embodiment, new/old backup AEDs have respectively defined ordered processes.) The change request is then deemed completed by the AED-sever upon receipt of both the relinquishment confirmation and the activation confirmation (e.g., and backup confirmations).

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

An Overlay Transport Virtualization (OTV) network is an example network configuration that is designed to support Layer 2 (L2) and Layer 3 (L3) virtual private networks (VPNs) over an L2 or L3 infrastructure. OTV networks provide an "overlay" method of doing virtualization versus traditional "in-the-network" type systems, in which multiple routing and forwarding tables are maintained in every device between a source and a destination. With OTV, state is maintained at the network edges, but is not required at other devices in a network site or in a core network. OTV operates at edge devices interposed between the network sites and the core network. The edge devices perform L2 learning and forwarding functions (similar to a traditional L2 switch) on their site-facing interfaces (internal interfaces) and perform IP based virtualization functions on their core-facing interfaces, for which an overlay network is created. The dual functionality of the edge device provides the ability to connect L2 networks, L3 networks, or hybrid (L2 and L3) networks together. OTV can also run at the same time as the network sites and the core network are operating "in-the-network" virtualization via VRF (Virtual Routing and Forwarding) or VNET (Virtual Network).

OTV illustratively encapsulates L2 traffic with an IP header ("MAC in IP"), rather than creating stateful tunnels. L2 traffic that requires traversing the overlay network to reach its destination is prepended with an IP header which ensures the packet is delivered to the edge device that provides connectivity to the L2 destination in the original MAC (Media Access Control) destination header. Traffic is forwarded natively in the core network over which OTV is deployed, based on the IP header. The native IP treatment of the encapsulated packet allows optimal multi-point connectivity as well as optimal broadcast and multicast forwarding. OTV is independent of the technology deployed in the core network and no changes are required to core devices.

In an illustrative embodiment, OTV provides a state to map a given destination MAC address in a L2 VPN to the IP address of the OTV edge device behind which that MAC address is located. OTV forwarding is therefore a function of mapping a destination MAC address in the VPN site to an edge device IP address in the overlay network. A control plane is used to exchange reachability information among the different OTV edge devices. In one embodiment, the control plane uses an overlay IGP (Interior Gateway Protocol) to carry MAC addresses and IP addresses. The MAC addresses are those of hosts connected to the network and the IP next hops are the addresses of the edge devices through which the hosts are reachable through the core.

In one embodiment, the control plane utilizes an IGP capable of carrying a mix of MAC unicast and multicast addresses as well as IP addresses (e.g., an Intermediate System-to-Intermediate System, or IS-IS IGP). The information carried in IGP advertisements is MAC unicast and multicast addresses with their associated virtual local area network (VLAN) IDs (or VNIDs in the case of L3 VPNs) and IP next hops. Since all MAC addresses on a site are advertised to all other sites, all edge devices have knowledge of all MAC addresses for each VLAN in the VPN.

FIG. 1 is a schematic block diagram of an example computer network 100, in which OTV may (though need not) be implemented. The network shown in FIG. 1 illustratively comprises a virtual private network (VPN) including two L2 network sites 110, site A and site B. A VPN is a collection of sites which are typically controlled by a single administration or organization, and where the addressing plan, router, and switch configuration is consistent as it would be if the sites were physically at the same location, notably, the sites may be a single or multi-homed connected network. Each site may comprise one or more traffic generators 132 interconnected within the site via some access device 134 (switch, router, etc.).

The network sites 110 are in communication with other network sites through a core network 120. The core network 120 may be an L2 metro Ethernet core, L3 IP network core, or an MPLS core, for example. As previously noted, OTV is independent of the technology deployed in the core network. OTV may be implemented, for example, on any network capable of correctly forwarding IP packets. Illustratively, the core network 120 is an L3 core, and is interconnected at an L2/L3 boundary with the sites via edge device 130 (e.g., ED A1-A4 in site A, and ED B1-B4 in site B). Within the core network 120 are one or more routers (or switches or other forwarding devices) 125 to direct traffic between the sites.

Data packets 140 (e.g., traffic and/or messages sent between the devices) may be exchanged among the devices of the computer network 100 using predefined network communication protocols such as certain known wired/wireless physical protocols as well as certain known communication protocols (e.g., Internet Protocol (IP), label switching, etc.) where appropriate. In this context, a protocol consists of a set of rules defining how the devices interact with each other.

Those skilled in the art will understand that any number of nodes, devices, links, etc. may be used in the computer network 100, and that the view shown herein is for simplicity.

Figure 2:
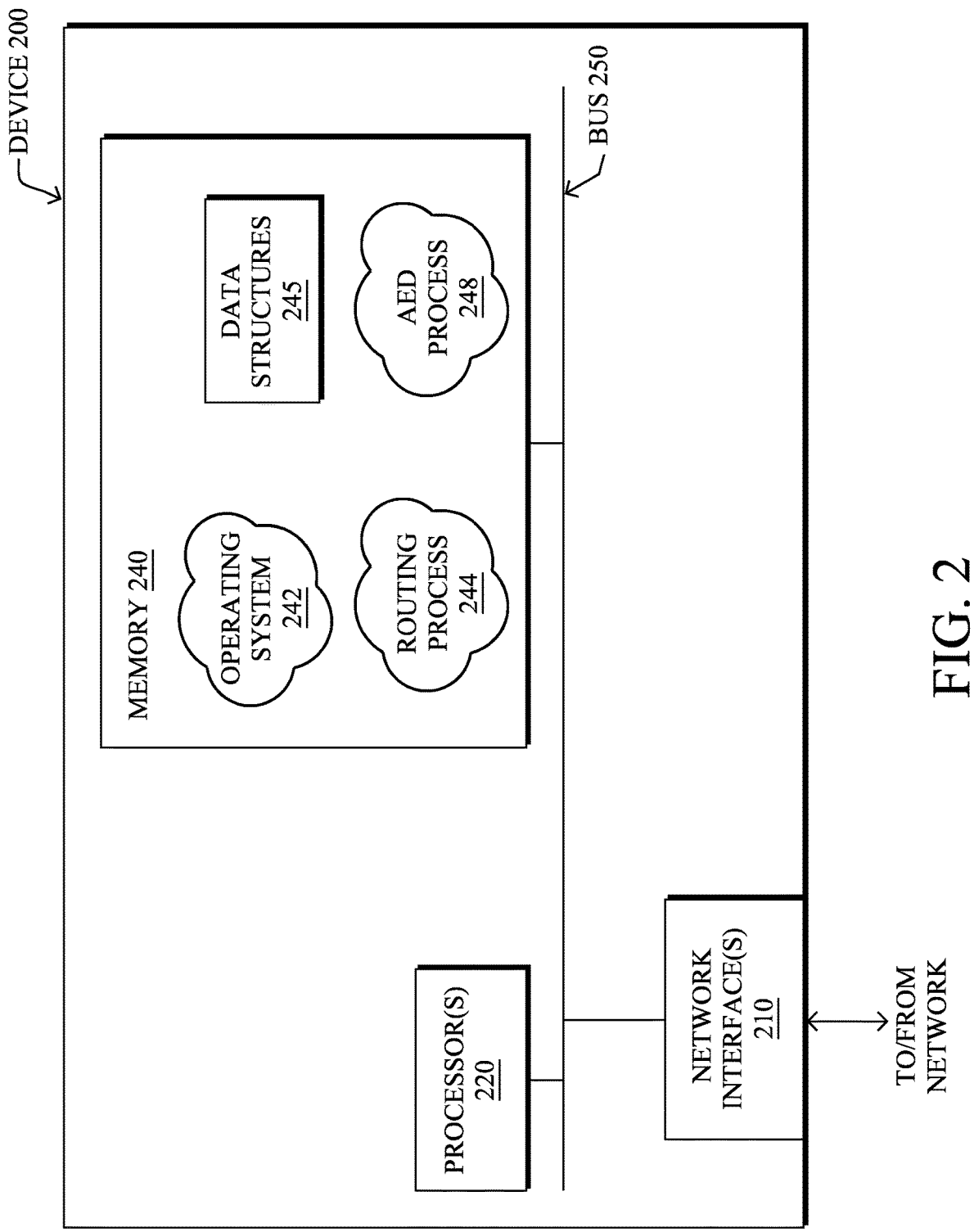
FIG. 2 illustrates an example network device.

FIG. 2 is a schematic block diagram of an example node/device 200 that may be used with one or more embodiments described herein, e.g., as any of the devices shown in FIG. 1 above, particularly a capable edge device. The device may comprise one or more network interfaces 210 (e.g., wired, wireless, etc.), at least one processor 220, and a memory 240 interconnected by a system bus 250. The network interface(s) 210 contain the mechanical, electrical, and signaling circuitry for communicating data over links coupled to the network 100. The network interfaces may be configured to transmit and/or receive data using a variety of different communication protocols.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative authoritative edge device (AED) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as various routing protocols as will be understood by those skilled in the art. These functions may, on capable devices, be configured to manage a routing/forwarding table (a data structure 245) containing, e.g., data used to make routing/forwarding decisions. In particular, certain interior gateway protocols (IGPs) (such as, e.g., link state routing such as Open Shortest Path First (OSPF), or Intermediate-System-to-Intermediate-System (ISIS)) and/or border gateway protocols (BGPs) may be used by the devices to build and maintain the routing/forwarding table(s), accordingly.

As noted above, L2 networks cannot tolerate momentary loops, as they can destabilize the network leading to prolonged broadcast storms and network meltdown. In addition, L2VPN over L3 technology demands multiple edge devices to have the ability to encapsulate and decapsulate data belonging to the same VLAN, which can cause L2 loops if there is even a momentary overlap of forwarding roles between two or more edge devices. Distributing VLANs amongst a set of edge devices demands an algorithm that strictly designates a VLAN to one and only one edge device at a given point in time despite messaging latency, loss, and other failures associated with distributed systems.

Specifically, given a set of edge devices (EDs) and a set of VLANs in a distributed system in steady state:

A given VLAN must be owned by a capable device (Forwarding condition);

Only one device should own a VLAN at a given time (Loop-Free condition); and

Upon device failure, redistribution of VLANs amongst remaining capable devices should be done in constant time, independent of number of VLANs or number of devices (Fast-Convergence condition).

Note that as per the Loop-Free condition, only a single device is ever the authoritative ED (AED) for a given VLAN, for both single-destination and multi-destination traffic. Also, as per the Fast-Convergence condition, any solution should also scale well when a large number of devices and a large number of VLANs are present and should provide convergence in constant time.

Centralized AED Management

The techniques herein designate forwarding roles amongst a group of devices for a number of VLANs, while ensuring that the forwarding roles are assigned in a deterministic, redundancy-free (loop-free) fashion through the use of a centralized AED-server that assigns the AED role to other EDs (including itself) in a given L2 site. In particular, AED reassignments and failures are handled with a constant number of messages, regardless of the number of devices and/or VLANs, and as such, ultra-fast convergence can be achieved in a highly scaled setup.

Specifically, according to one or more embodiments of the disclosure as described in detail below, an AED-server in a computer network maintains assignment of an active AED for a particular VLAN, and in response to a triggered re-assignment, sends an AED change request identifying an old active AED for the particular VLAN and a new active AED for the particular VLAN (e.g., and/or corresponding backups). In response to receiving the change request, the old active AED ceases forwarding of traffic for the particular VLAN and transmits a relinquishment confirmation into the network. Also, in response to receiving the change request and the relinquishment confirmation from the old active AED, the new active AED assumes responsibility for traffic forwarding for the particular VLAN and transmits an activation confirmation into the network. (In one embodiment, new/old backup AEDs have respectively defined ordered processes.) The change request is then deemed completed by the AED-sever upon receipt of both the relinquishment confirmation and the activation confirmation (e.g., and backup confirmations).

Illustratively, the techniques described herein may be performed by hardware, software, and/or firmware, such as in accordance with the authoritative edge device (AED) process 248, which may contain computer executable instructions executed by the processor 220 to perform functions relating to the techniques described herein, e.g., as either an edge device (ED) or AED-server, depending upon the defined roles of the device as described herein. Notably, the techniques herein may be treated as extensions to conventional AED protocols, and as such, may be processed by similar components understood in the art that execute those protocols, accordingly.

Operationally, in order to achieve synchronization of AED election among the EDs, a centralized model is illustrated herein where a single ED runs the AED election for each VLAN and assigns VLANs to EDs. This is preferred over distributed schemes since the number of messages exchanged is constant in most cases irrespective of number of edge devices in a site, it allows for easier debugging as the election machinery is in one place, and it is easier to extend the AED mechanism to incorporate policy and control.

Figure 3:
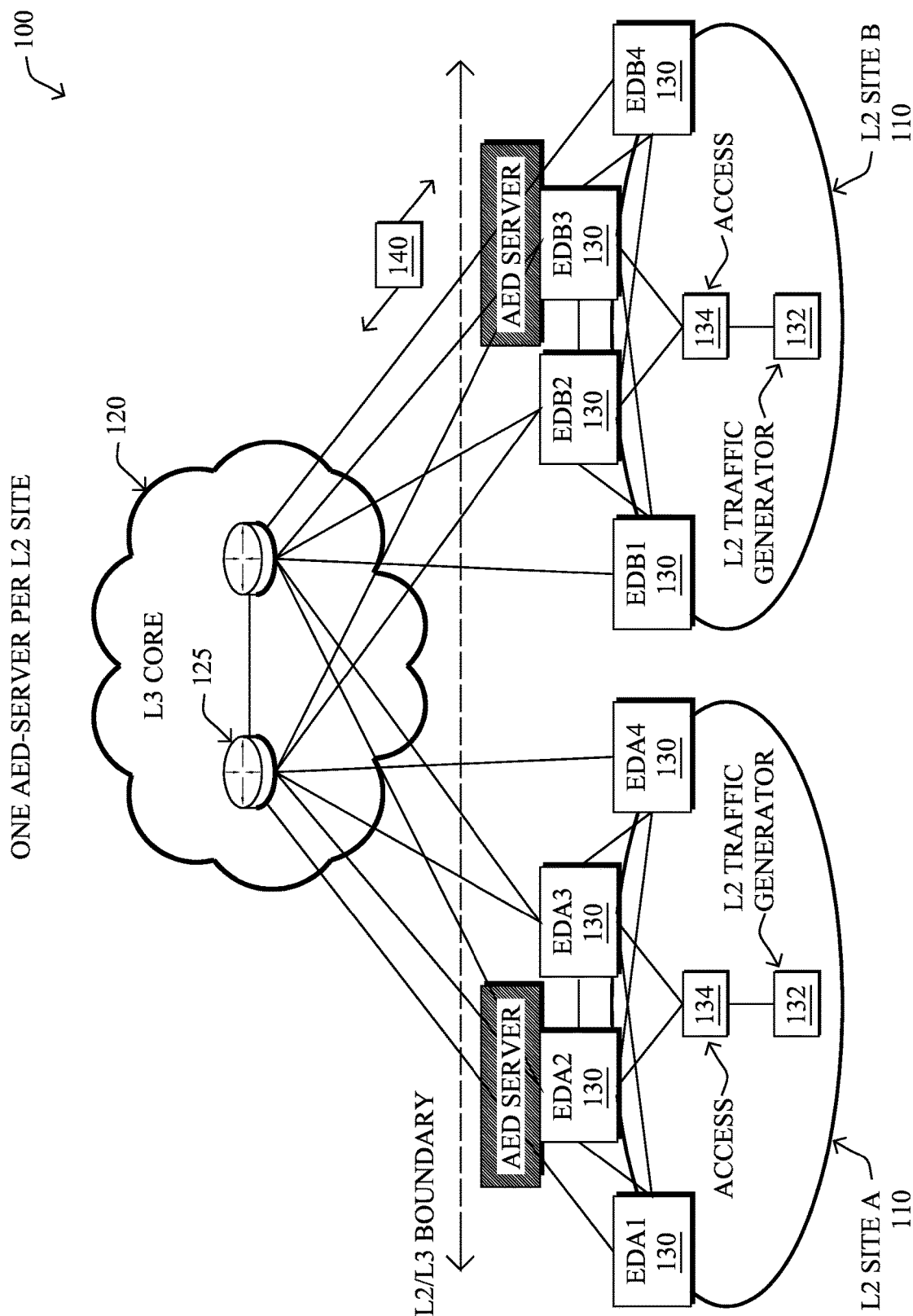
FIG. 3 illustrates an example view of the computer network showing authoritative edge device (AED)-servers.

With reference to FIG. 3, a single ED in each site is assigned as an "AED-Server" to localize the AED election and synchronization to only the relevant site EDs, as well as to distribute the processing load for multiple sites. Illustrative in FIG. 3, ED-A2 and ED-B3 have been selected as AED-servers. For redundancy, a backup AED-Server may also be assigned for the primary AED-server.

In general, the AED-server maintains assignment of an active AED (and optionally a backup AED) for each particular VLAN of the network site. That is, each ED in a site advertises its extended VLANs along with the forwarding readiness/AED capability for each VLAN on the overlay. The AED-Server takes a snapshot of the state of all EDs in the site and runs the AED election on this version. For each VLAN, the AED-server considers the EDs that are ready/capable, runs the AED election among them, and selects one ED as the AED and another ED as the backup AED.

The elected AED, once it assumes authority for a VLAN, continues forwarding for the VLAN until either:

1. It has a failure in forwarding for the VLAN or for the entire device. Then the backup AED takes over authority for the VLAN.
2. It is directed by the AED-Server to give up being AED due to the VLAN being reassigned to some other ED.

With reference now to FIGS. 4A-4D, the AED Election transactions (role assignment/reassignment) within a site are now described. Generally, the AED-Server schedules an AED election for a VLAN when there is a pending event, that is, it determines a trigger (AED election event, e.g., failure of an active/backup AED) for re-assignment of the active/backup AED for the particular VLAN, i.e., from an old active/backup AED to a new active/backup AED. Though only an active AED need be selected, for redundancy, in one or more embodiments herein, a backup AED may also be selected. In other words, for any VLAN, the AED election may compute both an Active and a Backup AED, where the Backup AED is the one that takes over the VLAN when the Active AED fails. All EDs listed in the AED result update ("change request") by the AED-Server must respond with a status/response update, after modifying their local AED state appropriately, and the AED-Server waits for the response from all the EDs before completing the transaction.

Figure 4A:
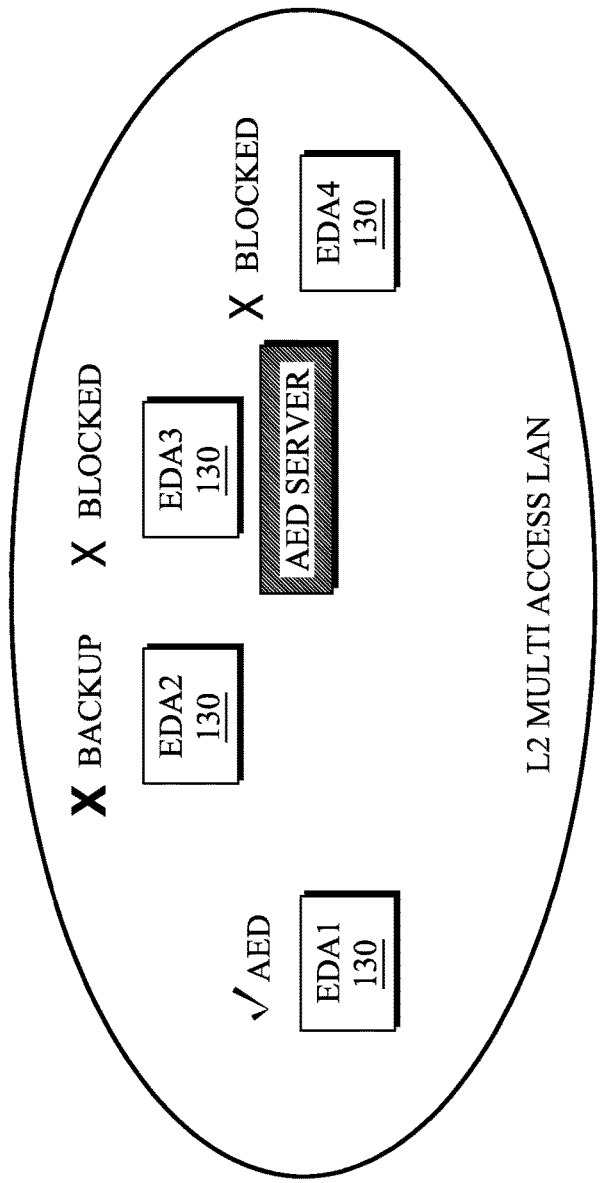
FIGS. 4A-4D illustrate examples of AED election transactions within a site.

As a specific example, assume that as shown in FIG. 4A, edge device ED-A1 ("A1" for short) is the primary (active) AED, and A2 is the backup. A3 is the AED-server. A2, A3, and A4 are currently blocking the VLAN, with A2 monitoring the liveness of A1 in its backup role. When the AED-Server computes a new AED (and possibly backup) for a VLAN, it effects a transition from the old AED pair (if one exists) to the new AED pair in an ordered and deterministic manner as described herein.

Figure 4B:
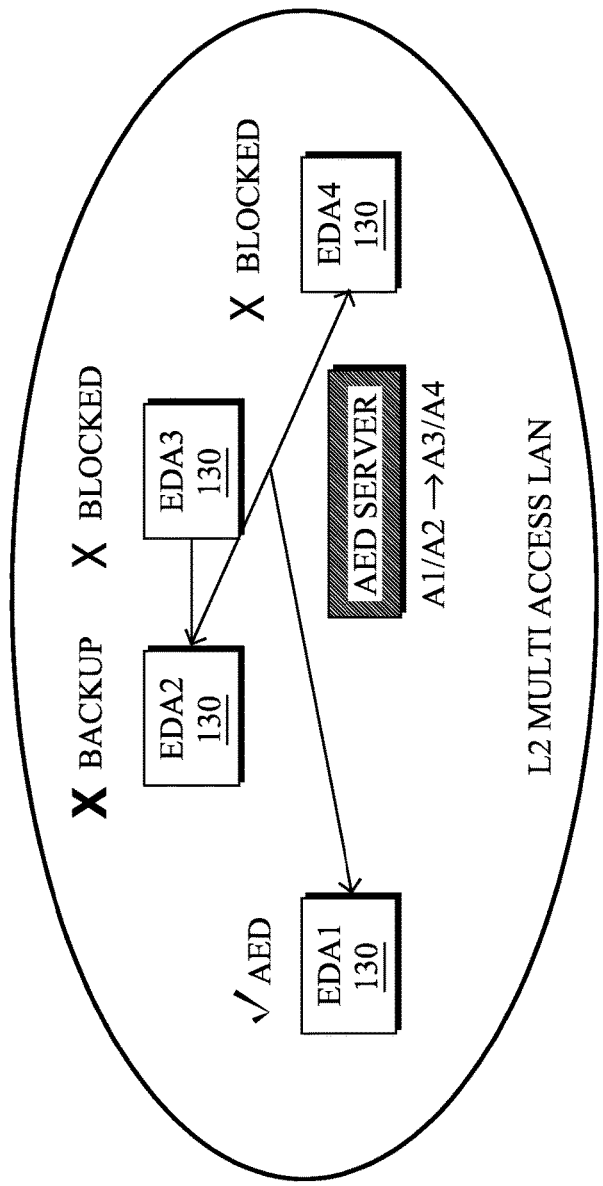
Figure 4C:
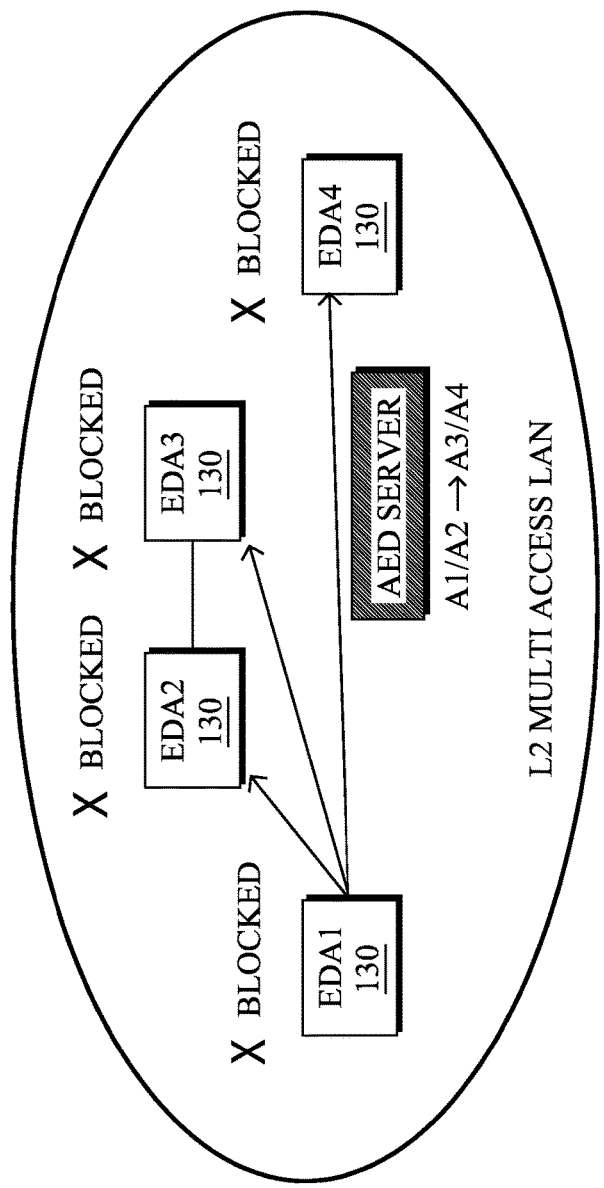

First, as shown in FIG. 4B, the AED-Server generates and sends into the network (site A) an AED change request message that includes the identities of the old and new AED pairs for the VLAN, shown as A1/A2→A3/A4 (old active AED/old backup AED→new active AED/new backup AED).

The old active AED, when it gets this message, must stop forwarding and respond with a message indicating that it has relinquished its AED status. In other words, as shown FIG. 4C, in response to receiving the change request at the old active AED, the old active AED (A1) ceases forwarding of traffic for the particular VLAN, and transmits a relinquishment confirmation into the network. The old backup AED (A2) also processes the request and generates a response relinquishing its backup status.

Figure 4D:
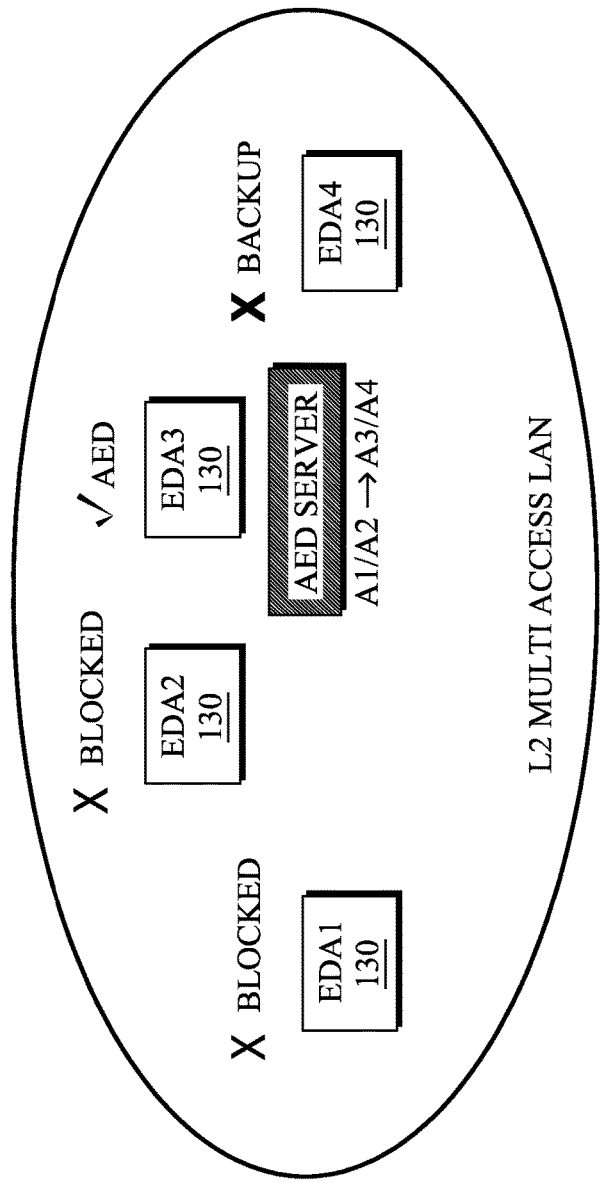

The new active AED, when it gets the AED-Server's message, must check the old AED pair's values in the message and wait for response from both. Once the new active AED processes the old AEDs' responses, it will become the AED and then sends a message indicating it has become AED, as shown in FIG. 4D. Said differently, in response to receiving the change request at the new active AED (A3), and in response to receiving the relinquishment confirmation from the old active AED (A1), and if a backup is assigned, in response to also receiving a backup relinquishment confirmation from the old backup AED (A2), the new active AED assumes responsibility for traffic forwarding for the particular VLAN, and transmits an activation confirmation into the network. Moreover, if assigned, the new backup AED (A4) also waits for a response from both old active/backup AEDs before assuming responsibility for backing up traffic forwarding for the particular VLAN and then sends its status message indicating it is the backup (i.e., transmitting a backup activation confirmation into the network).

The AED-Server only deems the transaction complete when it has seen responses from all the relevant EDs. That is, the change request is deemed completed by the AED-sever upon receipt of both the relinquishment confirmation (from the old active/primary AED A1) and the activation confirmation (from the new active/primary AED A3). Where backups are assigned, the AED-server also awaits receipt of the backup relinquishment confirmation (from the old backup AED A2) and the backup activation confirmation (from the new backup AED A4).

In general, for an AED transition of the kind (Old-Active/Old-Backup→New-Active/New-Backup), the new AED pair will wait for the old AED pair to give up responsibility. If an ED is included on both sides of the transaction, then it only waits for the other ED in the old pair. (In other words, in the event either the old active AED or old backup AED is the same AED as either the new active AED or new backup AED, that "same" AED waits only for a confirmation from a respective other AED prior to assuming new responsibility.) Note also that in this event, the AED-server need not wait for a confirmation from that same AED prior to deeming the change request completed, as well.

The AED-Server's request may contain a version number that it increments every time it runs a new AED for a VLAN. If so, this version number is reflected in all the response messages and is used by the new AED/backup AED and the AED-Server to identify the correct responses and ignore stale ones. Note that other EDs need not generate a response to an unrelated request.

In one or more embodiments herein, if AED re-assignment needs to be done for a large number of VLANs, the AED-Server can choose to pace the reassignment (the plurality of change requests) as long as the original forwarder of traffic does not fail. This pacing can help reduce network control plane traffic and can optimize the message propagation and handling times required for AED role reassignment.

Figure 5A:
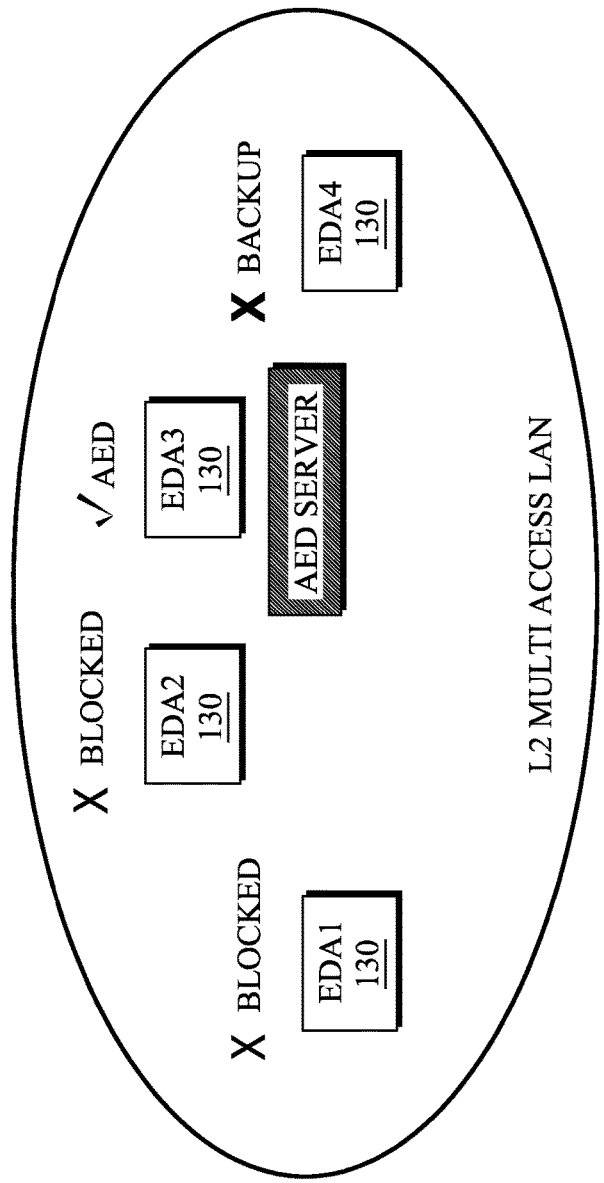
FIGS. 5A-5E illustrate examples of edge device failure and backup takeover.
Figure 5B:
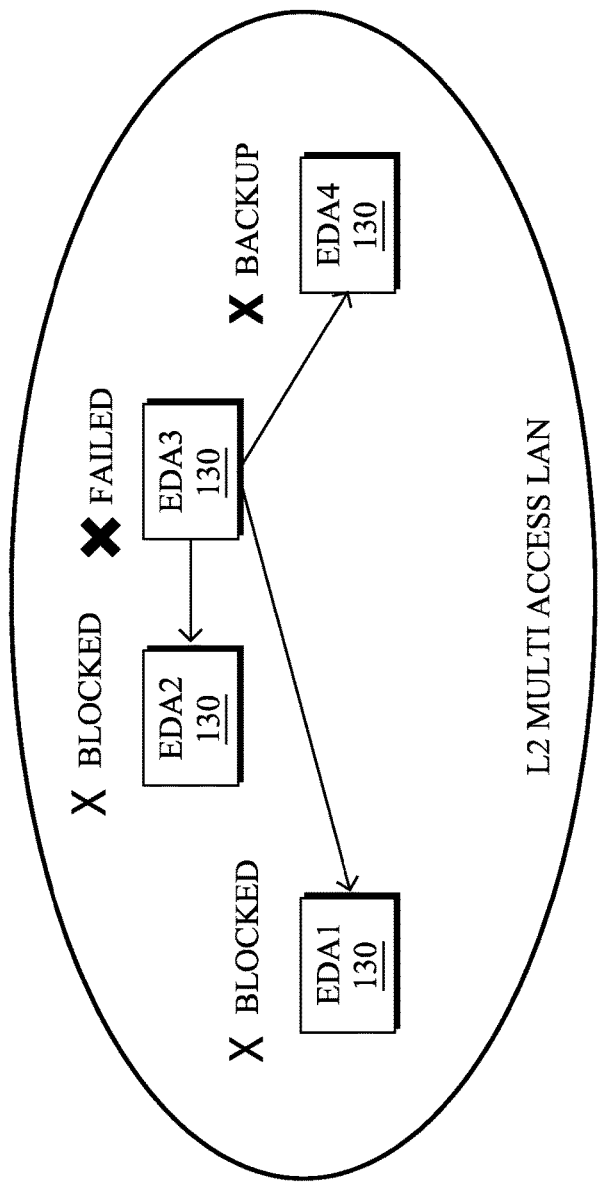
Figure 5C:
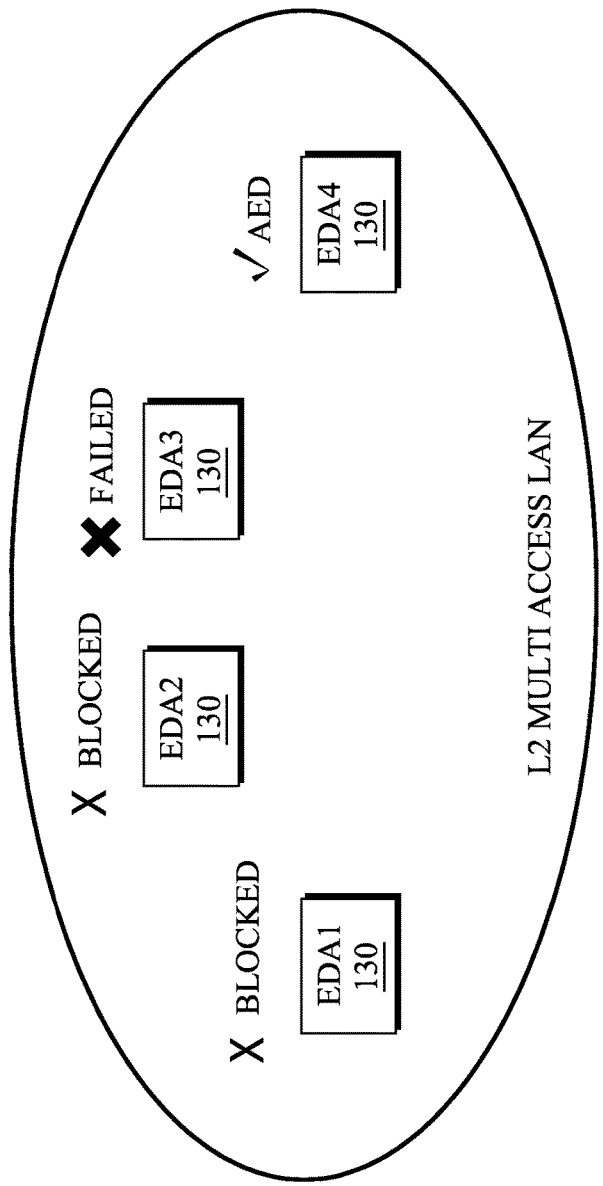

As an illustration of the techniques herein with regard to edge device failure, FIGS. 5A-5E depict an edge device failure and corresponding backup takeover. In particular, FIG. 5A illustrates the final result of FIG. 4D established above, where A3 is the primary/active AED, and A4 is the backup. An AED may have a local failure/event that makes it unable to forward for all VLANs, as shown in FIG. 5B. As such, the primary AED first ensures it has disabled forwarding for all VLANs, and if the ED still has overlay or site reachability, it can indicate this failure by bringing its AED capability down on either adjacency. If the failing AED (A3) does not have reachability or it has died, then other EDs will detect this failure via an adjacency timeout. In both cases, the pre-elected backup AED (A4) immediately assumes authority for the respective VLANs once the AED failure is determined and traffic will resume (shown in FIG. 5C). Once a backup AED takes over a VLAN, it generates a VLAN status update indicating it is now the primary/active AED and not a backup.

Figure 5D:
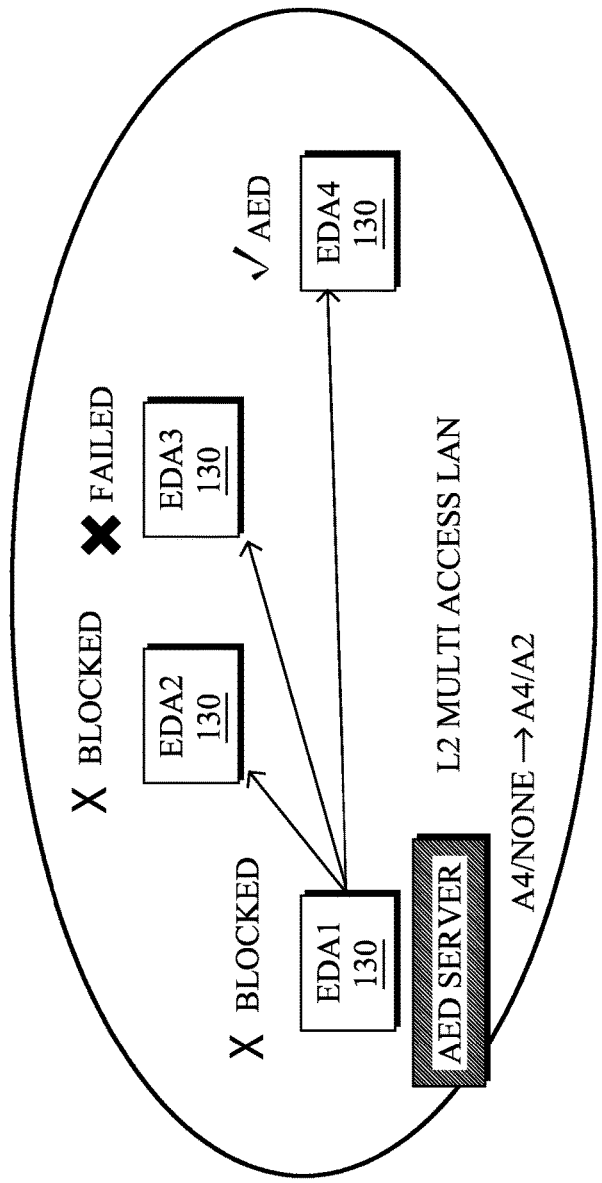

Generally, the AED-Server, when it detects the AED failure, runs an AED election, promotes the backup to the primary AED, computes a new backup AED and sends the result with a higher version number. The new AEDs respond to this result with a new status update. (Note that the earlier status update may be delayed or dampened enough to avoid generating duplicates.) As shown in FIG. 5D, however, the failed AED was in fact the AED-server. While it is possible to elect a new AED-server at this time, one or more embodiments herein establish AED-Server redundancy. In particular, similar to how a backup AED is assigned for a VLAN, a backup AED-Server role may also be assigned to one of the Edge Devices. The backup AED-Server (e.g., A1) upon detecting failure of the primary AED-Server (A3), assumes the responsibility of a primary AED-Server, builds the VLAN database from the network and resumes the AED Election processing. In this instance, a new backup AED-Server may then be chosen in the network.

Figure 5E:
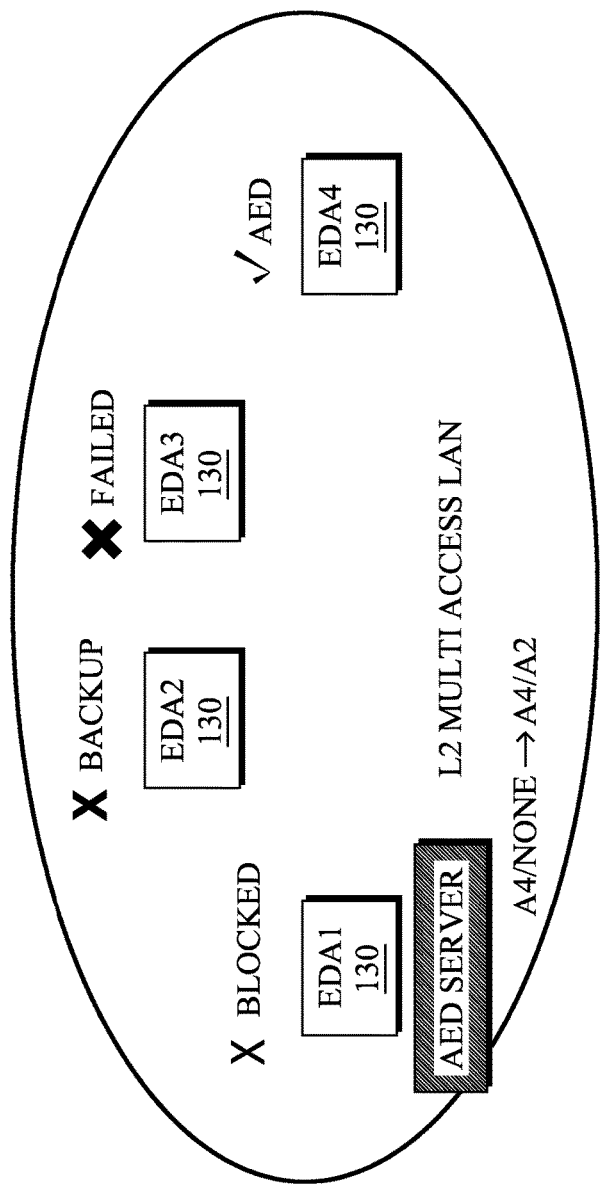

Also, as shown in FIG. 5D, the AED-Server (A1) may generate a change request electing a new backup AED (e.g., A4/None→A4/A2) to update the AED states within the network, shown then in FIG. 5E.

According to the techniques herein, therefore, in the VLAN AED re-assignment case, the analysis of number of messages required to converge is as follows:

Number of Messages=3.
Messages in Critical Path=1.
Convergence Time=O(1).

The number of messages and convergence times does not depend on the number of EDs in the site or on the number of VLANs. In the Device Failure case, it takes only one message on the LAN (indication of AED failure sent to the backup ED) for traffic convergence:

Number of Messages=1.
Convergence Time=O(1).

In the ED failure case too, the number of messages and convergence time again does not depend on the number of EDs or the number of VLANs. Hence the techniques herein ensure that forwarding roles are designated in a deterministic, loop-free fashion in the minimum possible number of messages, hence achieving ultra-fast convergence upon ED insertion and ED failure.

Figure 6:
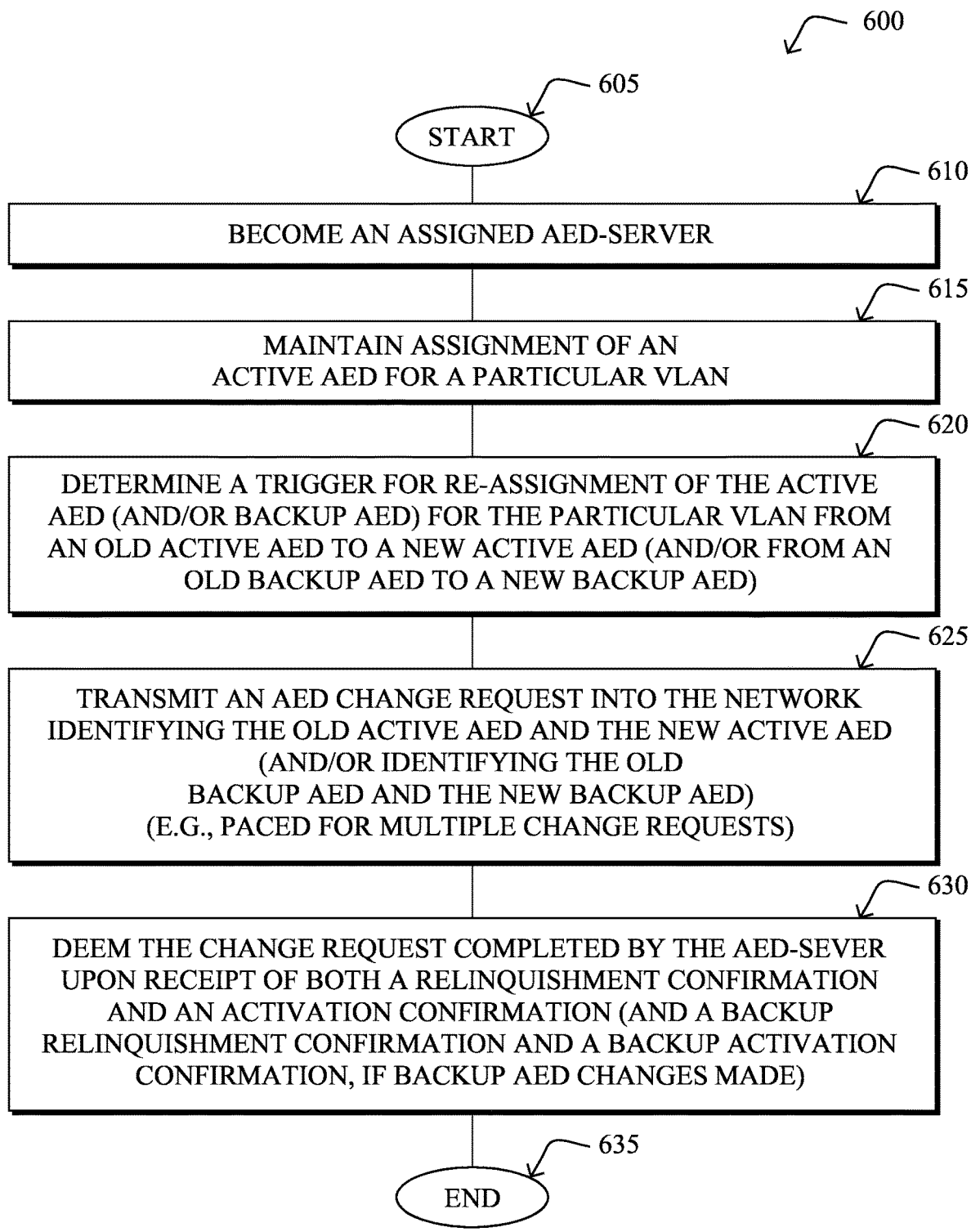
FIG. 6 illustrates an example simplified procedure for centralized AED management, particularly from the perspective of an AED-server.

FIG. 6 illustrates an example simplified procedure 600 for centralized AED management in accordance with one or more embodiments described herein, particularly from the perspective of an AED-server. The procedure 600 may start at step 605, and continues to step 610, where, as described in greater detail above, a particular device becomes an assigned AED-server, which in step 615 is configured to maintain assignment of an active AED for one or more particular VLANs within the AED-server's local site 110. In response to determining a trigger for re-assignment of the active AED for the particular VLAN from an old active AED to a new active AED in step 620, then in step 625 the AED-server transmits an AED change request into the network identifying the old active AED and the new active AED as described above. Notably, the re-assignment may also involve changing the backup AED, for the particular VLAN from an old backup AED to a new backup AED, in which case the change request also identifies the old backup AED and the new backup AED. Moreover, in the event there are a plurality of change requests (e.g., greater than a threshold amount), then the change request may be paced (and ordered) with other change requests. In step 630, the AED-server may deem the change request completed upon receipt of both a relinquishment confirmation and an activation confirmation, and in the case of backup AED changes as well, upon receipt of a backup relinquishment confirmation and a backup activation confirmation, accordingly. The illustrative simplified procedure 600 may then end in step 635.

Figure 7:
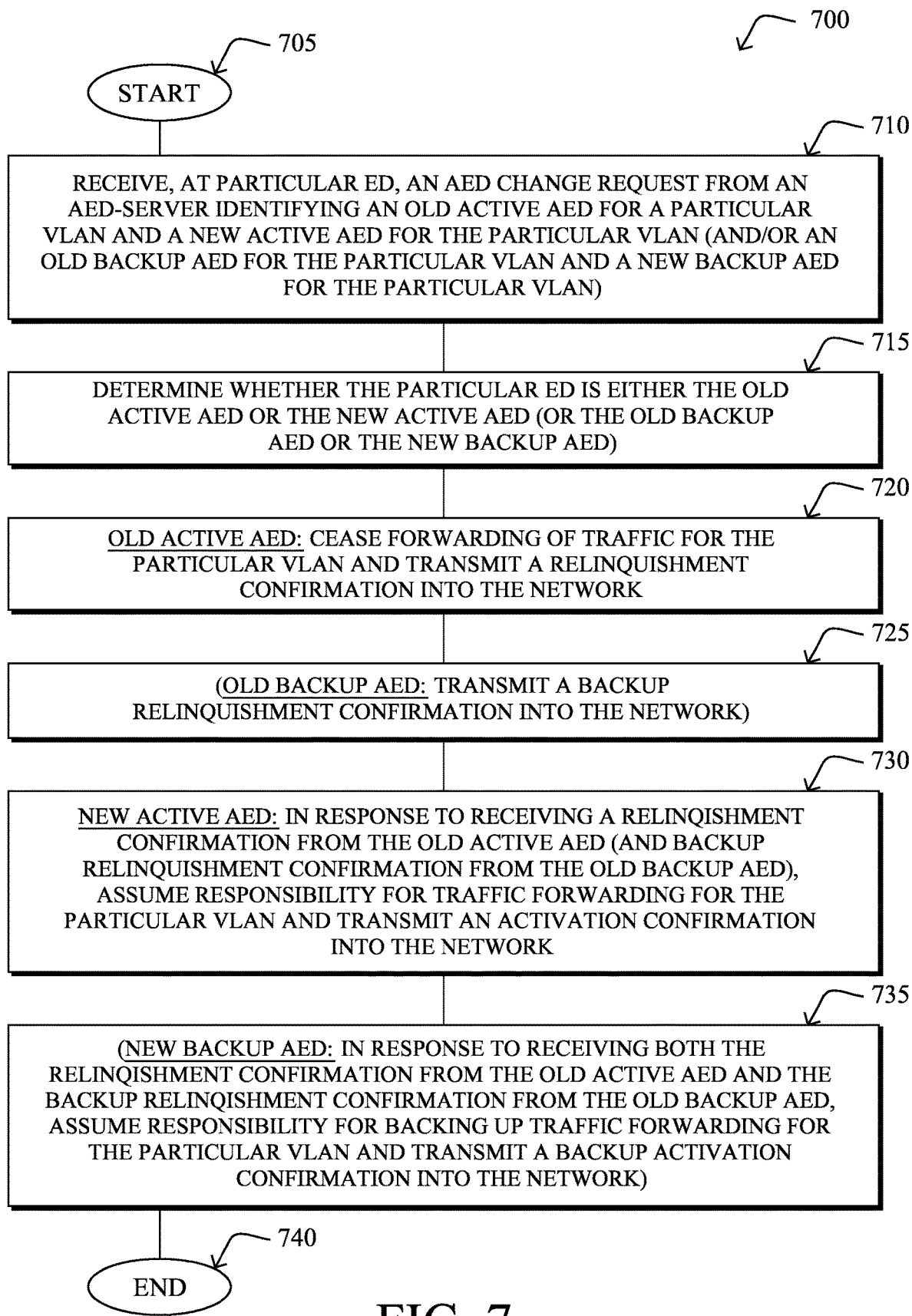
FIG. 7 illustrates an example simplified procedure 700 for centralized AED management, particularly from the perspective of an edge device (ED).

FIG. 7 illustrates an example simplified procedure 700 for centralized AED management in accordance with one or more embodiments described herein, particularly from the perspective of an edge device (ED). The procedure 700 may start at step 705, and continues to step 710, where, as described in greater detail above, the particular ED receives an AED change request from an AED-server identifying an old active AED for a particular VLAN and a new active AED for the particular VLAN (and/or an old backup AED for the particular VLAN and a new backup AED for the particular VLAN). As such, in step 715, the particular ED determines whether it is identified as the old active AED or the new active AED, and if backups are listed, the old backup AED or the new backup AED.

If the particular ED is the old active AED, then in step 720 the particular ED/old active AED ceases forwarding of traffic for the particular VLAN and transmits a relinquishment confirmation into the network.

If the particular ED is the old backup AED, then in step 725 the particular ED/old backup AED transmits a backup relinquishment confirmation into the network.

If the particular ED is the new active AED, then in step 730 the particular ED/new active AED, in response to receiving a relinquishment confirmation from the old active AED (and backup relinquishment confirmation from the old backup AED), assumes responsibility for traffic forwarding for the particular VLAN and transmits an activation confirmation into the network.

Lastly, if the particular ED is the new backup AED, then in step 735 the particular ED/new backup AED, in response to receiving both the relinquishment confirmation from the old active AED and the backup relinquishment confirmation from the old backup AED, assumes responsibility for backing up traffic forwarding for the particular VLAN and transmits a backup activation confirmation into the network.

The illustrative simplified procedure 700 then ends in step 740, for example, until a further change request is received.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein provide for centralized AED management. In particular, the techniques herein use a constant number of messages to achieve convergence, since the messages are independent of the number of VLANs and/or number of devices in the network. On low-scaled and high-scaled networks, the techniques herein provide ultra-fast convergence upon failures and insertions of edge devices. In addition, the techniques herein are deterministic and reliable in distributing the VLANs, hence reducing the chances of L2 loops in the network. Moreover, the centralized nature of the techniques herein allow for efficient policy control and management, and particularly for debugging and maintenance as compared to a distributed solution.

While there have been shown and described illustrative embodiments that provide for centralized AED management, it is to be understood that various other adaptations and modifications may be made within the spirit and scope of the embodiments herein. For example, the embodiments have been shown and described herein with relation to L2 and L3 edge devices and technologies such as OTV networks. However, the embodiments in their broader sense are not as limited, and may, in fact, be used with other types of network edges operating under different protocols that would benefit from the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
sending, from an authoritative edge device (AED)-server in a computer network, an AED change request identifying an old active AED for a particular virtual local area network (VLAN) and a new active AED for the particular VLAN, wherein the AED-server is a centralized server configured to run AED election for each VLAN in the computer network;
in response to receiving the change request at the old active AED, ceasing forwarding of traffic for the particular VLAN by the old active AED and transmitting a relinquishment confirmation into the network;
in response to receiving the change request at the new active AED, and in response to receiving the relinquishment confirmation from the old active AED, assuming responsibility for traffic forwarding for the particular VLAN by the new active AED and transmitting an activation confirmation into the network, wherein the new active AED assumes the responsibility for traffic forwarding for the particular VLAN and transmits the activation confirmation into the network in response to receiving both the relinquishment confirmation from the old active AED and a backup relinquishment confirmation from the old backup AED;
sending, from the AED-server, the change request identifying an old backup AED for the particular VLAN and a new backup AED for the particular VLAN;
in response to receiving the change request at the old backup AED, transmitting the backup relinquishment confirmation into the network;
deeming the change request completed by the AED-server upon receipt of the relinquishment confirmation, the activation confirmation, the backup relinquishment confirmation, and a backup activation confirmation; and in response to receiving the change request at the new backup AED, and in response to receiving both the relinquishment confirmation from the old active AED and the backup relinquishment confirmation from the old backup AED, assuming responsibility for backing up the traffic forwarding for the particular VLAN by the new backup AED and transmitting the backup activation confirmation into the network.

2. The method as in claim 1, further comprising:
in the event either the old active AED or the old backup AED is the same AED as either the new active AED or new backup AED, waiting, by the same AED, only for a confirmation from a respective other AED prior to assuming new responsibility.

3. The method as in claim 1, wherein the change request is in response to an AED election event for the particular VLAN.

4. The method as in claim 1, further comprising:
assigning a backup AED-server for the AED-server.

5. A method, comprising:
maintaining, by an authoritative edge device (AED)-server in a computer network, assignment of an active AED for a particular virtual local area network (VLAN), wherein the AED-server is a centralized server configured to control AED election for each VLAN in the computer network;

determining a trigger for re-assignment of the active AED for the particular VLAN from an old active AED to a new active AED;

transmitting an AED change request into the network identifying the old active AED and the new active AED,
wherein the change request causes the old active AED to cease forwarding of traffic for the particular VLAN and transmit a relinquishment confirmation into the network,
wherein the change request and relinquishment confirmation together cause the new active AED to assume responsibility for traffic forwarding for the particular VLAN and transmit an activation confirmation into the network, and
wherein the new active AED assumes the responsibility for traffic forwarding for the particular VLAN and transmits the activation confirmation into the network in response to receiving both the relinquishment confirmation from the old active AED and a backup relinquishment confirmation from the old backup AED;

sending, from the AED-server, the change request identifying an old backup AED for the particular VLAN and a new backup AED for the particular VLAN;

in response to receiving the change request at the old backup AED, transmitting the backup relinquishment confirmation into the network;

deeming the change request completed by the AED server upon receipt of the relinquishment confirmation, the activation confirmation, the backup relinquishment confirmation, and a backup activation confirmation; and in response to receiving the change request at the new backup AED, and in response to receiving both the relinquishment confirmation from the old active AED and the backup relinquishment confirmation from the old backup AED, assuming responsibility for backing up the traffic forwarding for the particular VLAN by the new backup AED and transmitting the backup activation confirmation into the network.

6. The method as in claim 5, further comprising:
in the event either the old active AED or the old backup AED is the same AED as either the new active AED or new backup AED, not waiting, by the AED-server, for a confirmation from the same AED prior to deeming the change request completed.

7. The method as in claim 5, wherein the change request is in response to an AED election event for the particular VLAN.

8. The method as in claim 7, wherein the AED election event is failure of an active AED for the particular VLAN.

9. The method as in claim 5, wherein the change request comprises a version number, and wherein the relinquishment confirmation and the activation confirmation contain the version number.

10. The method as in claim 5, further comprising:
pacing a plurality of change requests from the AED-server.

11. An apparatus, comprising:
one or more network interfaces to communicate with a computer network;
a processor coupled to the network interfaces and adapted to execute one or more processes; and
a memory configured to store a process executable by the processor, the process when executed operable to:
maintain, as an authoritative edge device (AED)-server, assignment of an active AED for a particular virtual local area network (VLAN), wherein the AED-server is a centralized server configured to run AED election for each VLAN in the computer network;
determine a trigger for re-assignment of the active AED for the particular VLAN from an old active AED to a new active AED;
transmit an AED change request into the network identifying the old active AED and the new active AED,
wherein the change request causes the old active AED to cease forwarding of traffic for the particular VLAN and transmit a relinquishment confirmation into the network,
wherein the change request and relinquishment confirmation together cause the new active AED to assume responsibility for traffic forwarding for the particular VLAN and transmit an activation confirmation into the network, and
wherein the new active AED assumes the responsibility for traffic forwarding for the particular VLAN and transmits the activation confirmation into the network in response to receiving both the relinquishment confirmation from the old active AED and a backup relinquishment confirmation from the old backup AED;
send the change request identifying an old backup AED for the particular VLAN and a new backup AED for the particular VLAN;
in response to receiving the change request at the old backup AED, transmit the backup relinquishment confirmation into the network; and
deem the change request completed upon receipt of the relinquishment confirmation, the activation confirmation, a backup relinquishment confirmation, and a backup activation confirmation,
wherein, in response to receiving the change request at the new backup AED, and in response to receiving both the relinquishment confirmation from the old active AED and the backup relinquishment confirmation from the old backup AED, the new backup AED assumes responsibility for backing up the traffic forwarding for the particular VLAN and transmits the backup activation confirmation into the network.

\* \* \* \* \*